3,300,280
CATALYST COMPOSITION AND PROCESS FOR THE RECOVERY OF SULFUR COMPOUNDS FROM GAS MIXTURES
René Terminet, Mourenx, France, assignor to Societe anonyme dite: Societe Nationale des Petroles d'Aquitaine, Paris, France
No Drawing. Filed Feb. 6, 1964, Ser. No. 343,107
Claims priority, application France, Feb. 11, 1963, 924,321
5 Claims. (Cl. 23—175)

It is an object of this invention to provide an improved catalytic composition which will be especially useful in the recovery of gaseous sulfur compounds contained at low concentrations in various gaseous mixtures, including especially the exhaust gases from fuel-burning apparatus and effluent gases from various industrial processes.

Another object is to provide an improved method of recovering sulfur compounds from gaseous mixtures of the kind just referred to in the form of sulfur trioxide.

A catalytic composition according to the invention essentially comprises alumina, activated or not, having vanadium pentoxide mixed therewith.

In a preferred form of the invention the composition comprises alumina, activated or not, impregnated with vanadium pentoxide and potassium oxide.

The vanadium pentoxide concentration in the composition is preferably in the approximate range from 0.5 to 8% by weight, a preferred range being about from 5 to 8%.

The potassium oxide, may be provided in a concentration ranging from about 0.01% to about 10% or more.

The catalyst of the invention may be prepared by any of various techniques which are generally conventional in the art. Thus, the ingredients specified above may first be mixed in pulverulent form and them agglomerated to desired shapes and sizes. A simple procedure is to impregnate the alumina with mother liquor containing soluble vanadium salts and if desired soluble potassium salts, and then calcining the resulting impregnated alumina. The impregnating and calcining steps may be repeated as many times as required in order to reach the desired concentrations of vanadium pentoxide and potassium oxide if present.

The catalyst composition of the invention possesses regenerable adsorptive properties. It further constitutes a highly efficient oxidizing catalyst.

When used in the improved process of the invention for the recovery of very low-concentration gaseous sulfur compounds from a gas mixture, the process involves two main steps: (a) an adsorption step wherein the sulfur compounds are adsorbed by the alumina at a temperature ranging from ordinary ambient temperatures to about 150° C., and (b) a desorption-and-oxidation step wherein the adsorbed sulfur compounds are first desorbed and/or burned to sulfur dioxide through combustion with an oxidizer such as air, pure oxygen or oxygen-enriched air, and then catalytically oxidized further to sulfur trioxide at a temperature of about from 400 to 500° C., preferably at about 430° C., in the presence of the vanadium pentoxide associated or not with potassium oxide.

The adsorption and desorption-oxidation steps of the process may be performed discontinuously and batchwise in a so-called fixed-bed process, or alternatively and preferably, by a continuous method using a moving or fluidized bed.

The requisite contact time between the gases and the catalyst in stage (b) depends on the concentration of the oxidizer agent in the catalyst composition used. Thus, where the catalyst of the invention includes about 6% by weight of vanaduim pentoxide plus 7–8% potassium oxide, a contact time of from about 0.25 to 0.35 second is required at a temperature of 430° C. for converting the sulfur dioxide into sulfur trioxide, with a conversion yield better than 94%.

The conversion yield of the $SO_2/SO_3$ conversion step remains advantageously high for vanadium pentoxide concentrations in the catalyst composition ranging about from 0.5 to 8% by weight and potassium oxide concentrations up to 10% and more. There appears to be an optimum around a vanadium pentoxide concentration of 6.5%. If the $V_2O_5$ concentration is decreased below 5% in the composition, the requisite contact time increases rather rapidly.

The variation in contact time becomes imperceptible beyond about 0.25 second when using a catalyst composition having a particle size of about from 2 to 5 mm. or less.

The ensuing tabulation gives the contact times and conversion yields observed in a series of tests in which the composition of the catalytic composition of the invention was varied.

| Test No. | Concentration of oxides in the catalyst | | Temperature, °C. | Contact time (seconds) | Conversion yield, percent |
|---|---|---|---|---|---|
| | $V_2O_5$ | $K_2O$ | | | |
| 1 | 6.2 | 0 | 430 | 2.5 | 80 |
| 2 | 8.2 | 0 | 430 | 3 | 86 |
| 3 | 6.2 | 8.4 | 430 | 0.25 to 2.5 | 94 |
| 4 | 6 | 10.6 | 430 | 0.25 to 2.5 | 94 |
| 5 | 7.1 | 7.3 | 430 | 0.25 to 2.5 | 94 |
| 6 | 3.6 | 6 | 430 | 2.8 | 91 |

In tests Nos. 3 through 5, the maximum in the conversion yield, 94%, was obtained after a contact time of 0.25 second in a single pass.

In test No. 6 the 91% yield was only attained after a contact time of 2.8 seconds.

In tests Nos. 1 and 2 where no $K_2O$ was present in the catalyst, the maximum yield was only obtained after relatively long contact periods, respectively 2.5 and 3 seconds. It will thus be apparent that the potassium oxide ingredient serves as an oxidation accelerator in the catalyst composition of the invention.

Additional tests were carried out at temperatures of from 350 to 500° C. The $SO_2/SO_3$ conversion yield was found to be substantially zero at 350° C. The conversion reaction was found effectively to set in between 390 and 400° C., and attain a maximum at about 430° C., the yield thereafter dropping to about 84% at 500° C.

The use of alumina without vanadium pentoxide in admixture with potassium oxide, under similar conditions results in the formation of sulfur dioxide but without subsequent conversion into sulfur trioxide.

The method of the invention is advantageously applicable to the treatment of exhaust and combustion gases of relatively low potential sulfur content for reducing atmospheric pollution while simultaneously producing a final gas mixture having an $SO_3$ concentration substantially higher than 5%, capable of being advantageously processed for the manufacture of sulfuric acid.

I claim:
1. A process of treating combustion gases for the recovery of gaseous sulfur compounds therefrom, comprising the steps of passing the gases over a catalyst consisting essentially of alumina, vanadium pentoxide and potassium oxide at a temperature ranging from room temperature to about 150° C. to adsorb sulfur constituents in said gases on said alumina, passing an oxygen-containing gas over the catalyst to desorb and oxidize said constituents to sulfur dioxide, and then elevating the temperature to a temperature sufficient to oxidize the dioxide to sulfur trioxide in the presence of the said catalyst.

2. A process according to claim 1 wherein the catalytic composition consists essentially of alumina having vanadium pentoxide mixed therewith in a proportion of about from 0.5 to 8.0% by weight and potassium oxide mixed therewith in a proportion of about from 0.01% to 10% or more by weight.

3. A process according to claim 1 wherein the proportion of vanadium pentoxide in the catalytic composition is from about 5 to 8% by weight.

4. The process according to claim 1, wherein the temperature is elevated to the range of about from 400 to 500° C. in the final step of the process.

5. The process according to claim 1, wherein the temperature is elevated to about 430° C. in the final step of the process.

References Cited by the Examiner

UNITED STATES PATENTS

| Re. 19,282 | 8/1934 | Slama et al. | 23—175 |
| 751,941 | 2/1904 | Raynaud et al. | 23—175 |
| 1,420,202 | 6/1922 | MacDowell et al. | 23—175 |
| 2,034,896 | 3/1936 | Calcott et al. | 252—464 |
| 2,209,908 | 7/1940 | Weiss | 252—464 |
| 2,551,905 | 5/1951 | Robinson | 23—2 |
| 2,747,968 | 5/1956 | Pigache | 23—178 |
| 3,186,794 | 6/1965 | Davies | 23—175 |

OSCAR R. VERTIZ, *Primary Examiner.*

MAURICE A. BRINDISI, R. M. DAVIDSON, A. J. GRIEF, *Assistant Examiners.*